(12) United States Patent
Shashank et al.

(10) Patent No.: US 8,226,351 B2
(45) Date of Patent: Jul. 24, 2012

(54) SYSTEM FOR PROVIDING CONTINUOUS LUBRICATION TO ENGINE TURBOCHARGER SHAFT AND BEARING ARRANGEMENT

(75) Inventors: Kishor Raut Shashank, Maharashtra (IN); Sharad Shete Manoj, Maharashtra (IN)

(73) Assignee: Mahindra & Mahindra Ltd., Mumbai (IN)

( * ) Notice: Subject to any disclaimer, the term of this patent is extended or adjusted under 35 U.S.C. 154(b) by 1033 days.

(21) Appl. No.: 11/794,821

(22) PCT Filed: Jan. 6, 2006

(86) PCT No.: PCT/IN2006/000007
§ 371 (c)(1),
(2), (4) Date: Jun. 20, 2008

(87) PCT Pub. No.: WO2006/095361
PCT Pub. Date: Sep. 14, 2006

(65) Prior Publication Data
US 2010/0061855 A1 Mar. 11, 2010

(30) Foreign Application Priority Data
Jan. 6, 2005 (IN) .......................................... 015/04

(51) Int. Cl.
F04D 29/06 (2006.01)
(52) U.S. Cl. ........................................ 415/112; 415/175
(58) Field of Classification Search .................. 415/110, 415/111, 112, 175, 176, 229
See application file for complete search history.

(56) References Cited

U.S. PATENT DOCUMENTS

| 2,002,809 | A | * | 5/1935 | Williamson, Jr. | 184/7.2 |
| 2,234,777 | A | * | 3/1941 | Puffer | 184/6.16 |
| 6,017,184 | A | * | 1/2000 | Aguilar et al. | 415/112 |
| 6,520,164 | B1 | * | 2/2003 | Lepp et al. | 123/572 |
| 6,688,928 | B2 | * | 2/2004 | Gokan et al. | 440/88 L |
| 7,134,282 | B2 | * | 11/2006 | Squires | 60/605.3 |

* cited by examiner

*Primary Examiner* — Edward Look
*Assistant Examiner* — Andrew C Knopp
(74) *Attorney, Agent, or Firm* — Colin P. Abrahams

(57) ABSTRACT

The present invention relates to lubrication system for turbocharger(s) [TC] to ensure continuous lubrication of bearings and shaft of the turbocharger with lubricant retention during start and shut down of turbocharger-associated systems thereby enhancing the performance and turbocharger life. The shaft (6) and bearings, are lubricated by introducing pressurized lubricating oil through an oil inlet passage (12) in the bearing housing (4) and after lubricating, the lubricant returns to the engine oil sump located below the turbocharger through the oil outlet passage (13). A non return valve (15) or one way valve in the oil inlet pipe (16) line permits lubricant flow to the bearings during engine running, and when the engine stops and oil pressure falls below the NRV (15) opening pressure, the NRV (15) shuts and traps the lubricant in oil inlet pipe that is above the NRV (15). The oil outlet pipe (17) due to its geometry retains sufficient lubricant in the bearing housing (4) which lubricates the shaft (6) and bearings post engine shutdown.

10 Claims, 2 Drawing Sheets

SYSTEM FOR PROVIDING CONTINUOUS LUBRICATION TO ENGINE TURBOCHARGER SHAFT AND BEARING ARRANGEMENT

FIELD OF THE INVENTION

The present invention relates to lubrication system for turbocharger(s) [TC] to ensure continuous lubrication of bearings and shaft of the turbocharger with lubricant retention during start and shut down of turbocharger-associated systems thereby enhancing the performance and turbocharger life.

BACKGROUND OF THE INVENTION

Turbochargers operating in conjunction with internal combustion engines increases the power to weight ratio without increasing the weight of the engine. Further a turbocharger ensures complete combustion of the fuel delivered to the engine, thereby reducing the emissions of the engine.

Turbochargers are driven by exhaust gases The idle speed of an exhaust driven turbocharger generally exceeds 30,000 rpm with top speed of about 90,000 to 120,000 rpm. During the running (operation) of the automobile engines the lubricant supplied to the turbocharger shaft and bearings by an engine lubrication system. When the oil pump of engine shuts down, the flow of lubricant to the turbocharger centre bearing ceases and the lubricant in the turbocharger oil outlet passage flows towards engine sump located at the bottom of the engine, thereby causes "dry run". Generally about 20 to 30 seconds may elapse between the engine shut down and the stoppage of the turbocharger during which the center bearing temperature may increase to around 1200° F. Under such conditions the turbocharger bearing assembly carbonizes which can lead to the failure of the bearing(s) and engine.

During the engine start-up, turbocharger oil input line is empty and the time lag between engine starting and pressurized lubricants to reach to the lubricating points is about 4.0 to 4.3 seconds. Further if the operator accelerates the engine/

U.S. Pat. No. 4,513,705 provides an oil storage reservoir & solenoid-actuating valve, wherein the lubricant is stored in the reservoir under pressure. This stored lubricant is part of oil supplied to the turbocharger during high speed/load running of the engine and the same is delivered after shut down and starting phase of the engine by means of actuation of solenoid valve provided at the reservoir opening. This system overcomes the problem of possible turbochargers "dry-run". The limitation of this system is dependant on the functioning of the solenoid valve and its malfunctioning can lead to the undesired "dry-run" of the turbocharger. Further it leads to problems in interfacing with the system, requires frequent maintenance and servicing resulting in increased cost.

U.S. Pat. Nos. 6,709,160 B1 U.S. Pat. No. 5,993,173, U.S. Pat. No. 5,145,334, U.S. Pat. No. 4,708,602 disclose several options for turbocharger lubrication systems involving using specially designed floating/semi-floating bearings, modifying oil circulation passages in a turbocharger bearing (centre) housing, providing separate and simplified bearing assembly. These patents disclose systems that facilitate effective turbocharger shaft and bearing arrangement lubrication during the running of the engine/vehicle, but do not address the lubrication issues leading to possible "dry-runs" at the start and stop of the engines.

U.S. Pat. No. 4,422,295 discloses a lubricating system for TCs wherein the turbochargers bearings are located at or below the normal level of oil in the lubricating sump for return of oil from the sump to the TC bearings when the engine is not running so as to ensure cooling of the bearing when the engine is not running. However an additional equipment such as a scavenging pump is positioned within the crankcase and is driven by the engine to return the oil from the TC to the crankcase during the running, it is well established that additional equipment in the system increases the possibilities of failure thereby requiring increased maintenance and higher cost of the overall system and operation.

It is a long-standing need in the industry to provide solutions for continuous lubrication of turbocharger shaft and bearings during start and stop operations of TC-Associated systems.

SUMMARY OF THE INVENTION

The main object of the invention is to provide continuous lubrication for turbocharger(s) to ensure continuous lubrication of bearings and shaft of the turbocharger with lubricant retention during start and shut down phase of TC-associated systems thereby enhancing the performance and turbocharger life Another object of the invention is to provide a TC that does not use additional devices to ensure continuous lubrication of bearings and shaft arrangement of the turbocharger with lubricant retention during engine/vehicle starting and shut down phase.

Yet another object of the invention is to provide a TC with lubrication and lubrication retention that operates automatically during the start and stop of TC-associated systems without any intervention of the operator.

Yet another object of the invention is to provide TC, which operates without any dry-run during start and stop of the TC-associated systems.

DETAIL DESCRIPTION OF THE INVENTION

A preferred embodiment of the invention is described below.

Figure 1:
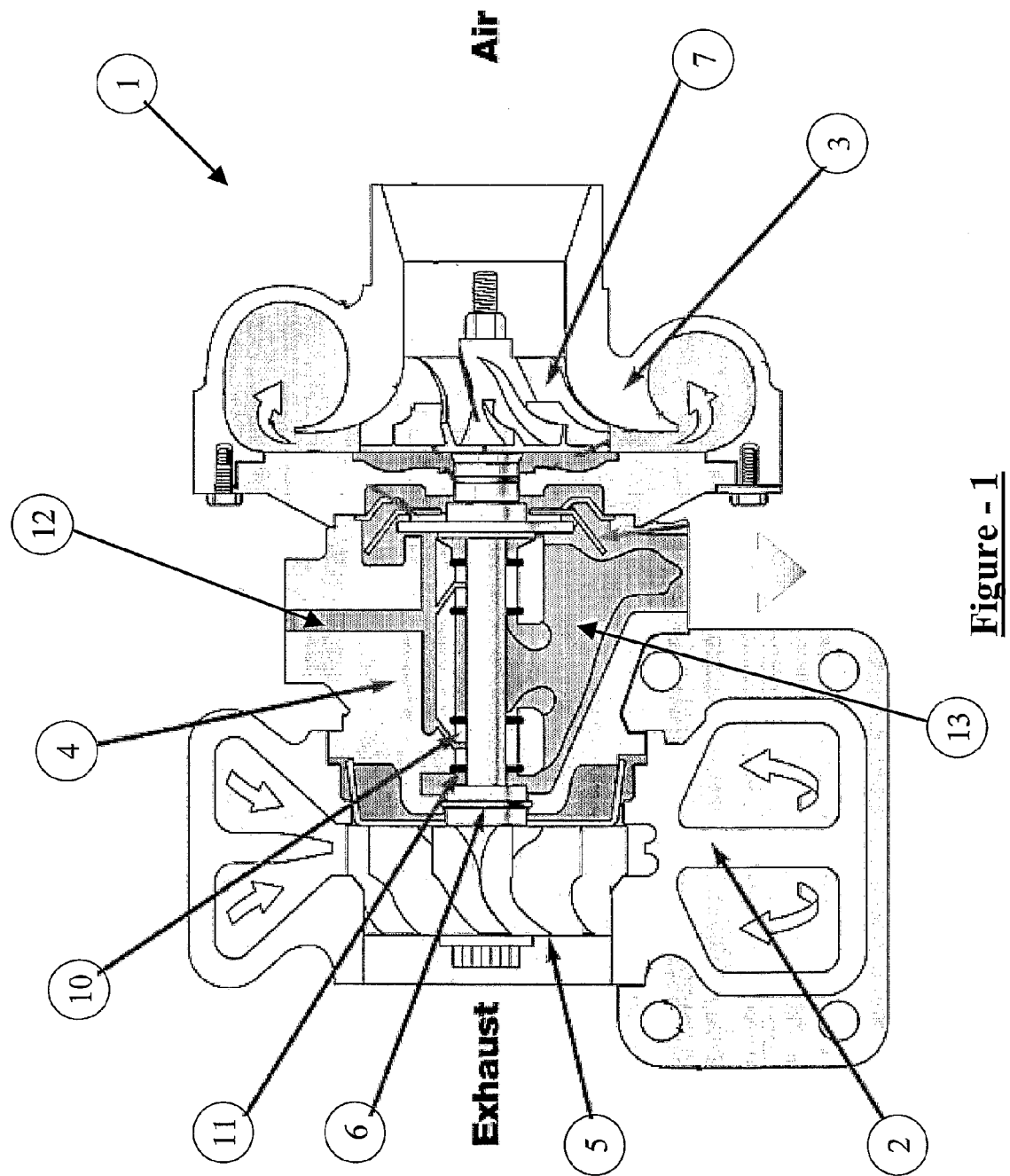
FIG. 1 shows the sectional view of the exhaust driven turbocharger.
Figure 2:
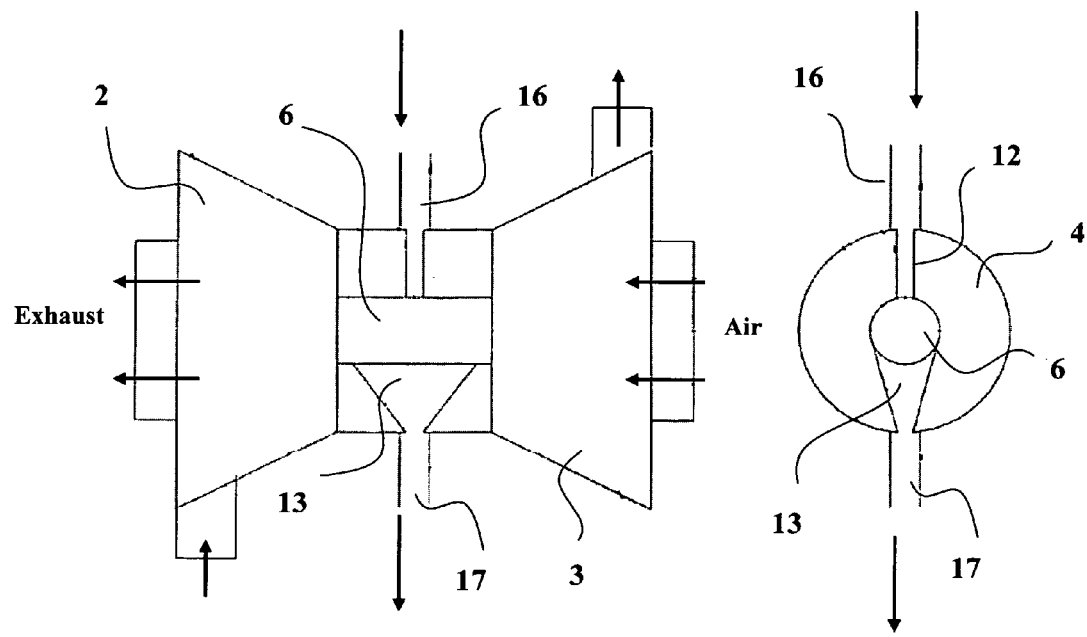
FIG. 2 shows schematic front and side view of the turbocharger in its conventional form, wherein lubricant inlet and outlet passages are opposite to each other facilitating gravity flow of turbocharger lubricant towards engine crankcase.

An exhaust driven turbocharger assembly (1) used in internal combustion engines shown in FIG. 1 comprises a turbine housing (2), a compressor housing (3), and a bearing housing (4) disposed between the turbine and compressor housings, with the turbine housing and compressor housings held on either side by a connecting means, a turbine wheel (5) mounted on a shaft (6) in a turbine housing (2) wherein the shaft (6) extends through the bearing housing (4) into the compressor housing (3), a compressor wheel (7) in the compressor housing (3) mounted at the distal end of the shaft (6) and is supported in the bearing housing (4), pair of floating journal bearings (10) on either end of the bearing housing (4) to support the rotating shaft (6), seals (11) at both ends of the bearing housing near the floating journal bearings (10) to prevent the entry of the exhaust gas and compressed air into the bearing housing (4) and to further absorb any axial thrust load, which comes on the rotating shaft, a non return valve [NRV] or one way valve (15) in the oil inlet pipe line (16) with opening and/or closing pressure less than the oil pressure during the idle running of an engine, an oil outlet line (17) so constructed to retain sufficient quantity of lubricating oil thereby allowing adequate lubrication of the shaft & bearings after engine/vehicle shutdown wherein an oil outlet pipe having one end thereof connected to a turbocharger oil outlet and extends downwardly therefrom and forms a first inflection point (A), and from said first inflection point (A) the oil outlet pipe inflects upwardly and forms a second inflection point (B) which is positioned at a level around the center of the shaft, and extends downwardly with another end going to oil sump, thereby to retain a sufficient amount of oil at turbocharger shaft and bearing portion by maintaining oil between the turbocharger oil outlet and second inflection point (B) in the oil outlet line even after an engine lubrication oil pump is shut off to ensure adequate lubrication at the earliest moment when the engine starts again.

In one embodiment of the invention, a second arm of the oil outlet pipe goes upwards and may be at an angle up to about 45' with respect to a first vertical arm of the oil outlet pipe that goes downwards from the turbocharger.

Figure 3:
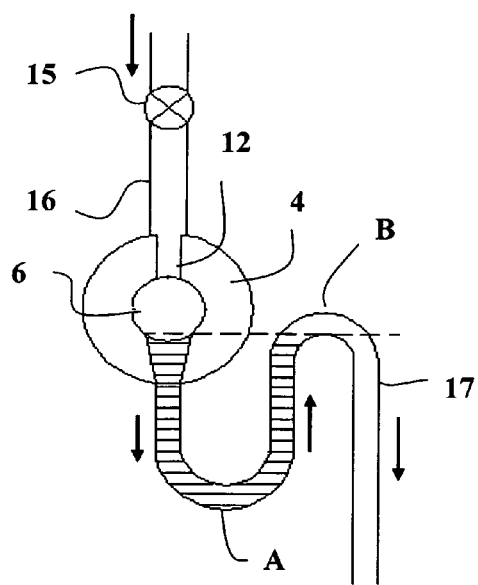
FIG. 3 shows the side view of the turbocharger according the present invention, wherein Non Return Valve (NRV) is provided in the inlet line/passage. The outlet line is modified to ensure retention of lubricating oil.

FIG. 3 presents a preferred embodiment of the outlet pipe (17).

To lubricate shaft (6) and bearings (10), pressurized lubricating oil is introduced through an oil inlet passage (12) in the bearing housing (4). Lubricants from the oil inlet passage (12) flow to the bearings (10) and after lubricating, the lubricant returns to the engine oil sump located below the turbocharger through the oil outlet passage (13). The NRV (15) permits the lubricant flow to the bearings (10) during running of the engine, whereas when the engine stops and oil pressure falls below the NRV opening pressure, the NRV shuts and traps the lubricants in oil inlet pipe (16) that is above the NRV. During subsequent engine starting, lubricating oil is available in sufficient quantity in the oil inlet pipe (16) above the NRV, which facilitates the oil to reach the shaft (6) & bearings (10) in minimum time thereby preventing "dry-run" conditions of the shaft. The same remains valid under conditions when the operator accelerates the engine/vehicle immediately after starting. When the engine is shutdown, the lubricant supply to the turbocharger shaft stops, the oil outlet pipe (17) due to its geometry retains sufficient quantity of lubricant in the bearing housing (4) which adequately lubricates the shaft and the bearings.

In conventional turbochargers as described in prior art, have oil inlet pipe connected to the oil inlet at the top of the turbocharger and the oil outlet pipe goes vertically downwards to the oil sump. In contrast, the lubrication system of the present invention has NRV in the oil inlet pipe and the oil outlet pipe is so constructed with bend and inflection to retain sufficient quantity of lubricant even after the engine shutdown, which does not happen in conventional systems.

The connecting means of the compressor housing, bearing housing, and the turbine housing is selected from bolts, clamps and their like.

In a preferred embodiment the inflection point of the oil outlet pipe is at the level of the shaft center.

In yet another embodiment, the inflection point of the oil outlet pipe may be just below or above the shaft center.

We claim:

1. A lubrication system for turbocharger(s) to ensure continuous lubrication of bearings and shaft of the turbocharger with lubricant retention during start and shut down of turbocharger-associated systems comprising a turbine housing, a compressor housing, and a bearing housing disposed between the turbine and compressor housings, with the turbine housing and compressor housings held on either side by a connecting means, a turbine wheel mounted on a shaft in a turbine housing wherein the shaft extends through the bearing housing (4) into the compressor housing, a compressor wheel in the compressor housing mounted at the distal end of the shaft and is supported in the bearing housing, a pair of floating journal bearings on either end of the bearing housing to support the rotating shaft, seals at the both ends of bearing housing near the floating journal bearings to prevent the entry of the exhaust gas and compressed air into the bearing housing and to further absorb any axial thrust load, which comes on the rotating shaft, a non return valve [NRV] or one way valve in an oil inlet pipe line with opening and/or closing pressure less than oil pressure during idle running of an engine, an oil outlet line so constructed to retain sufficient quantity of lubricating oil thereby allowing adequate lubrication of the shaft and bearings after engine/vehicle shutdown wherein an oil outlet pipe having one end thereof connected to a turbocharger oil outlet and extends downwardly therefrom and forms a first inflection point (A), and from said first inflection point (A) the oil outlet pipe inflects upwardly and forms a second inflection point (B) which is positioned at a level around the center of the shaft, and extends downwardly with another end going to oil sump, thereby to retain a sufficient amount of oil at turbocharger shaft and bearing portion by maintaining oil between the turbocharger oil outlet and second inflection point (B) in the oil outlet line even after an engine lubrication oil pump is shut off to ensure adequate lubrication at the earliest moment when the engine starts again.

2. A lubrication system for turbocharger(s) as claimed in claim 1 wherein, the connecting means of the compressor housing, bearing housing, and the turbine housing is selected from bolts, clamps and their like.

3. A lubrication system for turbocharger(s) as claimed in claim 1 wherein, the second inflection point of the oil outlet pipe is at the level of the shaft center.

4. A lubrication system for turbocharger(s) as claimed in claim 1, wherein the second inflection-point of the oil outlet pipe is just below or above the shaft center.

5. A lubrication system for turbocharger(s) as claimed in claim 1, wherein a second arm of the oil outlet pipe going upwards may be at an angle up to about 45° with respect to a first vertical arm of the oil outlet pipe that goes downwards from the turbocharger.

6. A lubrication system for turbocharger(s) as claimed in claim 1, wherein the shaft and bearings, are lubricated by introducing pressurized lubricating oil through an oil inlet passage in the bearing housing and after lubricating, the lubricant returns to the engine oil sump located below the turbocharger through the oil outlet passage.

7. A lubrication system for turbocharger(s) as claimed in claim 1, wherein the non return valve [NRV] or one way valve in the oil inlet pipe line permits a lubricant flow to the bearings during running of the engine, and when the engine stops and oil pressure falls below the NRV opening pressure, the NRV shuts and traps the lubricants in oil inlet pipe that is above the NRV.

8. A lubrication system for turbocharger(s) as claimed in claim 1, wherein during engine starting after a shut down, lubricating oil is available in sufficient quantity in the oil inlet pipe above the NRV, which facilitates the oil to reach the shaft and bearings in minimum time thereby preventing "dry-run" conditions of the shaft.

9. A lubrication system for turbocharger(s) as claimed in claim 1, wherein under conditions when the operator accelerates the engine/vehicle immediately after starting, lubricating oil is available in sufficient quantity in the oil inlet pipe above the NRV, which facilitates the oil to reach the shaft and bearings in minimum time thereby preventing "dry-run" conditions of the shaft.

10. A lubrication system for turbocharger(s) as claimed in claim 1, wherein the engine when shutdown, the lubricant supply to the turbocharger shaft stops, and the oil outlet pipe due to its geometry retains sufficient quantity of lubricant in the bearing housing which adequately lubricates the shaft and the bearings.

* * * * *